(12) United States Patent
Hurtado et al.

(10) Patent No.: US 12,060,145 B2
(45) Date of Patent: Aug. 13, 2024

(54) VEHICLE PANEL ASSEMBLY AND METHOD OF PANEL ASSEMBLY

(71) Applicant: THE BOEING COMPANY, Chicago, IL (US)

(72) Inventors: Joe L. Hurtado, Easley, NC (US); Chau T. Le, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 177 days.

(21) Appl. No.: 17/653,227

(22) Filed: Mar. 2, 2022

(65) Prior Publication Data

US 2023/0278691 A1  Sep. 7, 2023

(51) Int. Cl.
| | | |
|---|---|---|
| *B64C 1/10* | (2006.01) | |
| *B32B 3/12* | (2006.01) | |
| *B32B 3/26* | (2006.01) | |
| *B32B 5/02* | (2006.01) | |
| *B32B 5/18* | (2006.01) | |
| *B32B 5/24* | (2006.01) | |
| *B32B 7/12* | (2006.01) | |
| *B32B 15/04* | (2006.01) | |
| *B32B 37/12* | (2006.01) | |

(52) U.S. Cl.
CPC .................. *B64C 1/10* (2013.01); *B32B 3/12* (2013.01); *B32B 3/266* (2013.01); *B32B 5/024* (2013.01); *B32B 5/18* (2013.01); *B32B 5/245* (2013.01); *B32B 7/12* (2013.01); *B32B 15/046* (2013.01); *B32B 37/12* (2013.01); *B32B 2262/101* (2013.01); *B32B 2266/0278* (2013.01); *B32B 2605/18* (2013.01)

(58) Field of Classification Search
CPC .. B64C 1/10; B32B 3/12; B32B 3/266; B32B 5/024; B32B 5/18; B32B 5/245; B32B 7/12; B32B 15/046; B32B 37/12; B32B 2262/101; B32B 2266/0278; B32B 2605/18
See application file for complete search history.

(56) References Cited

U.S. PATENT DOCUMENTS

| | | | |
|---|---|---|---|
| 4,344,995 A | 8/1982 | Hammer | |
| 9,593,206 B2 * | 3/2017 | White | .................... C08G 73/10 |
| 2006/0101771 A1 | 5/2006 | Holman et al. | |
| 2007/0101679 A1 | 5/2007 | Harthcock et al. | |
| 2009/0155502 A1 * | 6/2009 | Cournoyer | ................ B32B 1/08 |
| | | | 428/116 |
| 2016/0083072 A1 * | 3/2016 | Koreis | .................... B32B 3/266 |
| | | | 428/116 |

OTHER PUBLICATIONS

Extended EP Search Report received for related EP App.: 23159651.1 dated Jul. 5, 2023 (8 pages).

* cited by examiner

*Primary Examiner* — Rodney A Bonnette
(74) *Attorney, Agent, or Firm* — The Small Patent Law Group LLC; Philip S. Hof

(57) ABSTRACT

A panel assembly for use in a vehicle includes a first face sheet, a second face sheet, and a core layer disposed between the first and second face sheets. The core layer is defined by a base material along a first section of the panel assembly, and the core layer is defined by a honeycomb structure along a second section of the panel assembly. The first section and the second section are discrete, and the first section that includes the base material extends along a perimeter of the panel assembly.

20 Claims, 5 Drawing Sheets

VEHICLE PANEL ASSEMBLY AND METHOD OF PANEL ASSEMBLY

FIELD OF THE DISCLOSURE

Embodiments of the present disclosure generally relate to panels with layered structures for installation within vehicles, such as aircraft.

BACKGROUND OF THE DISCLOSURE

Vehicles, such as aircraft, utilize panels in bulkheads for partitioning the internal volume of the vehicle into different areas (e.g., passenger cabin, cargo bay, pilot cockpit, etc.). The bulkheads also provide structural support during travel of the vehicle to absorb forces from sidewalls and retain the shape of the fuselage or main body component of the vehicle. One known type of panel used within vehicle bulkheads is secured to structural supports within the vehicle via a metal frame that extends along the perimeter of the panel.

FIG. 1A shows a panel assembly 10 in the prior art. FIG. 1B is a cross-section of a portion of the prior art panel assembly 10 taken along line 1B-1B in FIG. 1A. The panel assembly 10 includes a composite panel 12, a metal frame 14 that holds the panel 12, and multiple fasteners 16 for mounting the panel assembly 10 to structural supports of the vehicle. The metal frame 14 borders the panel 12. The metal frame 14 includes a receiver section 17 and a mounting flange 19 that extends from the receiver section 17. The receiver section 17 includes a slot 18 defined between first and second ribs 20, 22 of the receiver section 17. An edge segment 24 of the panel 12 is received within the slot 18 and is retained between the ribs 20, 22. The mounting flange 19 defines openings 26 through which the fasteners 16 are inserted to mount the panel assembly 10 to the structural supports of the vehicle. The metal frame 14 may be extruded, such as an aluminum extrusion. The fasteners 16 are spaced apart from the composite panel 12 via the frame 14.

The illustrated panel assembly 10 is relatively complex, which increases the cost of manufacturing. Some aspects that contribute to the complexity include forming the frame members and assembling the metal frame 14 to surround and hold the composite panel 12. Even with a relatively light metal, such as aluminum, the metal frame 14 adds significant weight to the panel assembly 10. Heavy internal panels are undesirable in vehicle applications due to reduced traveling fuel efficiency and increased difficulty of installation on the vehicle (relative to lighter-weight panel assemblies).

SUMMARY OF THE DISCLOSURE

A need exists for a panel assembly and a method for assembling a panel for a vehicle that has less weight, is less complex, and is easier to assemble and install than known panel assemblies, such as the panel assembly 10 in FIGS. 1A and 1B. A need exists for a panel assembly that is more economical and efficient to manufacture than known panel assemblies.

With those needs in mind, certain embodiments of the present disclosure provide a panel assembly for use in a vehicle. The panel assembly includes a first face sheet, a second face sheet, and a core layer disposed between the first and second face sheets. The core layer is defined by a base material along a first section of the panel assembly, and the core layer is defined by a honeycomb structure along a second section of the panel assembly. The first section and the second section are discrete, and the first section that includes the base material extends along a perimeter of the panel assembly.

Certain embodiments provide a method for assembling a composite panel is provided. The method includes securing a honeycomb structure to an interior surface of a first face sheet. The method includes securing a base material to the interior surface of the first face sheet. The base material and the honeycomb structure are secured to different portions of the interior surface, and the base material extends along a perimeter of the first face sheet. The method includes securing a second face sheet to at least one of the honeycomb structure or the base material such that the honeycomb structure and the base material are sandwiched between the first and second face sheets.

Certain embodiments provide an aircraft that includes a fuselage and a panel assembly. The fuselage defines an internal volume and includes one or more structural supports. The panel assembly is coupled to the fuselage within the internal volume. The panel assembly includes a first face sheet, a second face sheet, a core layer, and multiple fasteners. The core layer is disposed between the first and second face sheets. The core layer is defined by a base material along a first section of the panel assembly, and the core layer is defined by a honeycomb structure along a second section of the panel assembly. The first section and the second section are discrete. The first section that includes the base material follows a contour of a perimeter of the panel assembly. The panel assembly defines multiple mounting holes that continuously extend through the first face sheet, the base material, and the second face sheet. The mounting holes are spaced apart from the honeycomb structure. The fasteners extend through the mounting holes and are coupled to the one or more structural supports to mount the panel assembly to the fuselage.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features.

Moreover, unless explicitly stated to the contrary, embodiments "comprising" or "having" an element or a plurality of elements having a particular condition can include additional elements not having that condition.

Certain embodiments of the present disclosure provide a panel assembly for use on a vehicle. The panel assembly according to the embodiments disclosed herein may have less weight than known panel assemblies, including the panel assembly 10, which may contribute to more energy-efficient vehicle travel and ease of installation. The panel assembly disclosed herein may be sufficiently structurally stable and resilient to absorb significant forces without damaging the panel assembly. Such forces may include impact forces from cargo, decompression pressure, stress and strain loads from an exterior body (e.g., fuselage) of the vehicle during travel, and/or the like. The panel assembly may also be less complex and costly to manufacture than known panel assemblies, such as the assembly 10.

The panel assembly may be used in various applications onboard a vehicle. For example, the panel assembly may be installed within a bulkhead wall that partitions the internal volume of the vehicle. The bulkhead wall may be located within a cargo area, a passenger area, and/or the like. In another example, the panel assembly may be used as a sidewall panel, a floor panel, a door, or the like. The relatively light weight of the panel assembly makes the panel assembly beneficial in aircraft applications, but the panel assembly may also be installed in rail vehicles, trucks, buses, automobiles, off-road trucking equipment, watercraft, spacecraft, and the like. Optionally, the panel assembly disclosed herein may be installed in non-vehicular applications, such as within office buildings, retail businesses, residential buildings, manufacturing facilities, and/or the like.

Figure 2:
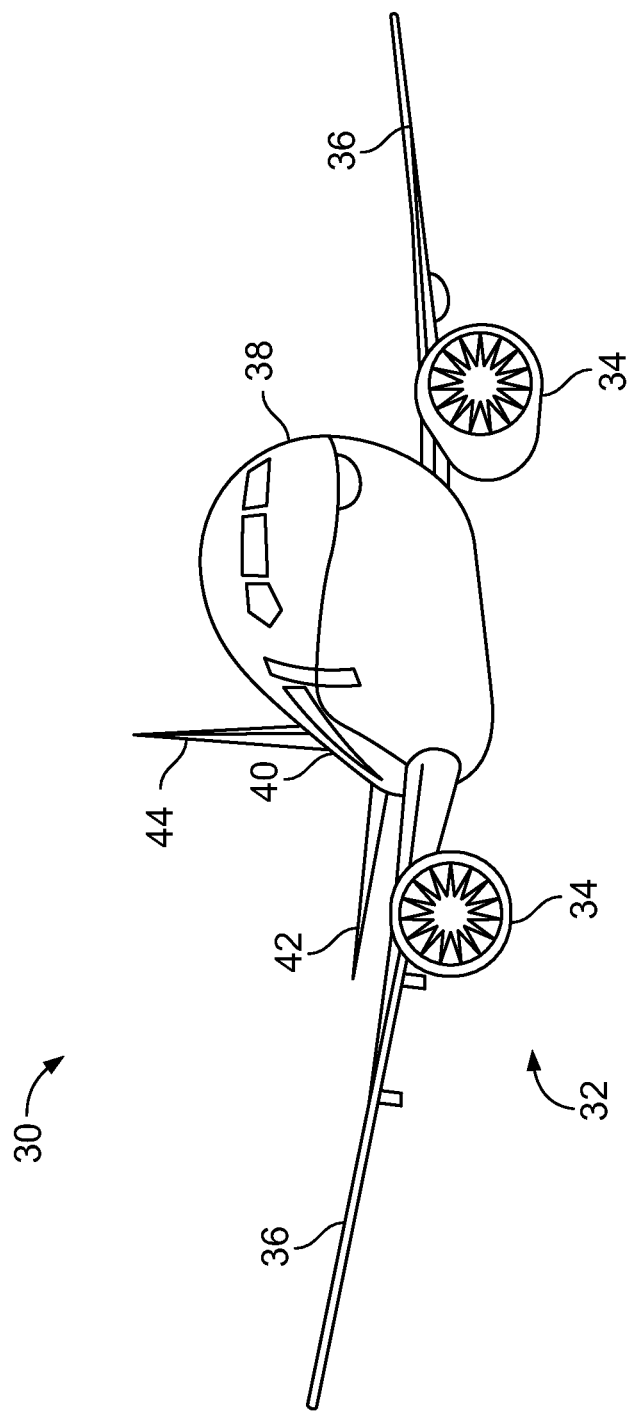
FIG. 2 illustrates a perspective front view of an aircraft which includes a panel assembly according to the embodiments described herein.

FIG. 2 illustrates a perspective front view of an aircraft 30 which includes a panel assembly according to the embodiments described herein. The aircraft 30 includes a propulsion system 32 that includes engines 34, for example. Optionally, the propulsion system 32 may include more engines 34 than shown. The engines 34 are carried by wings 36 of the aircraft 30. In other embodiments, the engines 34 may be carried by a fuselage 38 and/or an empennage 40 of the aircraft 30. The empennage 40 may also support horizontal stabilizers 42 and a vertical stabilizer 44.

The fuselage 38 of the aircraft 30 defines an internal volume, which includes a flight deck or cockpit, one or more work sections (for example, galleys, personnel carry-on baggage areas, and the like), one or more passenger sections (for example, first class, business class, and coach sections), one or more cargo areas (e.g., bays), one or more lavatories, and/or the like. The panel assembly, and a plurality of such panel assemblies, disclosed herein may be located within the internal volume of the aircraft.

Figure 3:
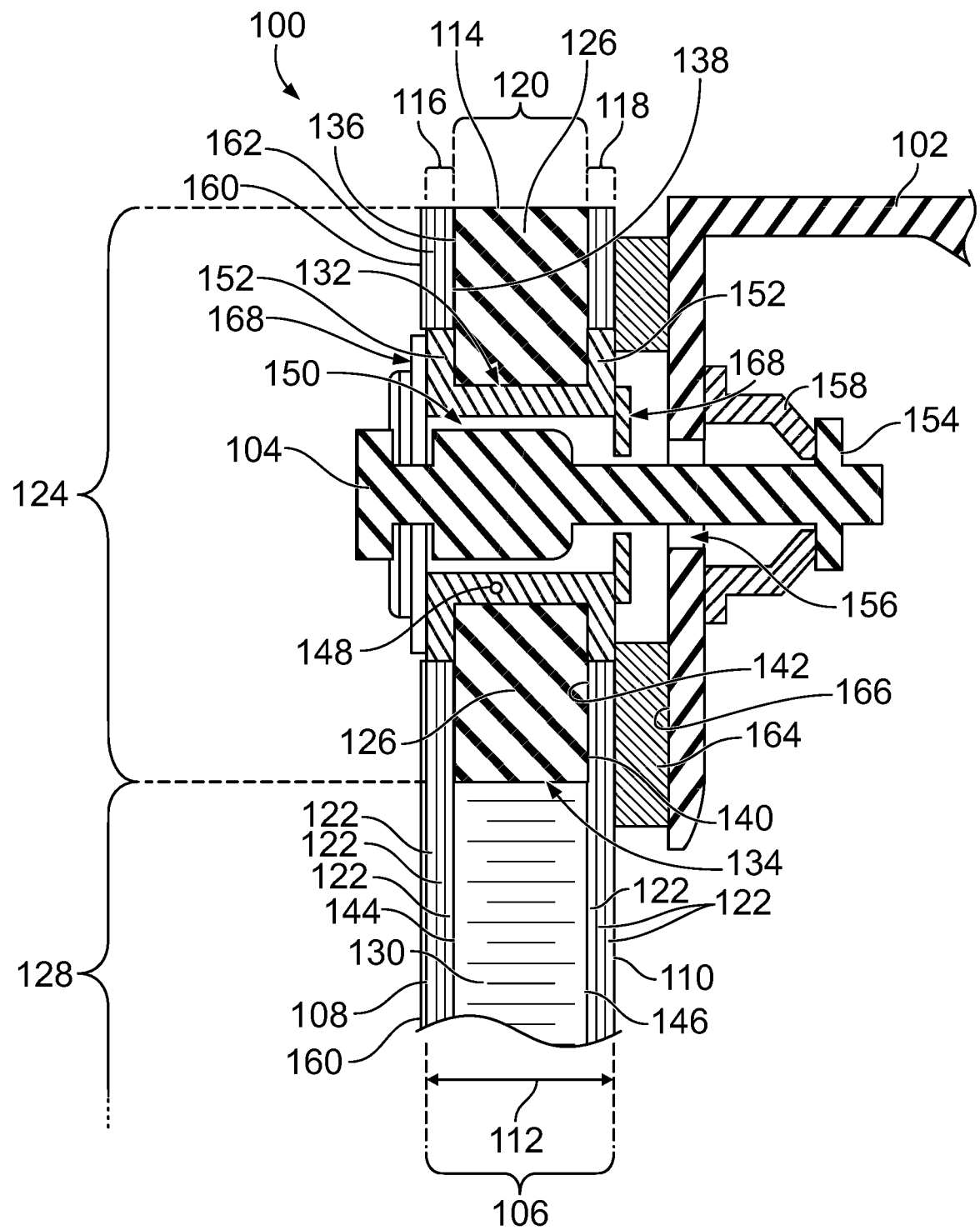
FIG. 3 is a cross-sectional view of a portion of a panel assembly, according to an embodiment of the present disclosure.

FIG. 3 is a cross-sectional view of a portion of a panel assembly 100 according to an embodiment. The panel assembly 100 is coupled to a structural support 102 for mounting the panel assembly 100. The structural support 102 may be a component of a vehicle. For example, the structural support 102 may be attached to a body of a vehicle, such as the fuselage 38 of the aircraft 30 shown in FIG. 2. The structural support 102 can be any mountable structure, such as a plate, a frame member, a stringer, a sidewall, or the like. The panel assembly 100 is coupled to the structural support 102 via one or more fasteners 104. Only one fastener 104 is shown in the illustrated portion of the panel assembly 100, but additional fasteners 104 can be utilized to couple other portions of the panel assembly 100 to the structural support 102 or a different structural support. In an embodiment, the fastener(s) 104 represent components of the panel assembly 100. For example, the panel assembly 100 may include a composite panel 106 and the fastener(s) 104. Alternatively, the fastener(s) 104 may be considered as discrete and separate from the panel assembly 100.

Figure 1A:
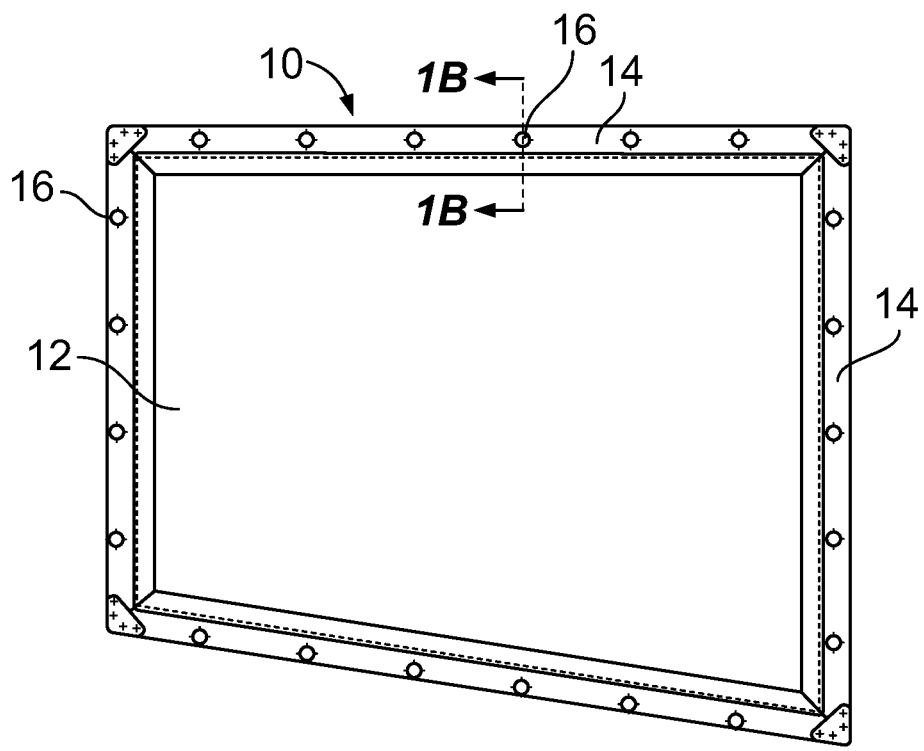
FIG. 1A shows a panel assembly in the prior art.
Figure 1B:
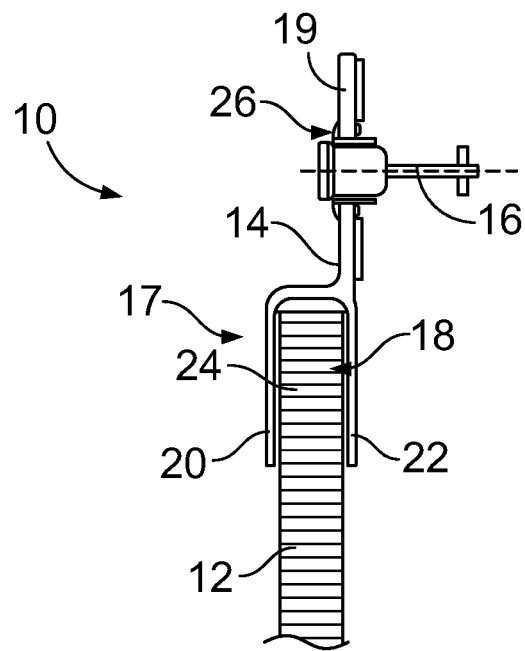
FIG. 1B is a cross-section of a portion of the prior art panel assembly shown in FIG. 1A.

The illustrated portion of the panel assembly 100 may be comparable in size and location to the illustrated portion of the panel assembly 10 shown in FIG. 1B. Unlike the panel assembly 10, the panel assembly 100 does not include a metal frame that borders and holds a composite panel. The fastener(s) 104 in the panel assembly 100 extend through hole(s) 132 that are defined by the composite panel 106 itself, not a secondary structure fitted to the panel 106. By lacking a discrete metal frame, the panel assembly 100 may be relatively lightweight. Furthermore, the panel assembly 100 may be assembled without tools, or at least avoids some of the tools required to construct the known panel assembly 10. The panel assembly 100 may be less costly and complex to manufacture than the known panel assembly 10, as described herein in more detail.

The composite panel 106 of the panel assembly 100 includes a first side 108 and a second side 110 opposite the first side 108. In the illustrated embodiment, the second side 110 faces the structural support 102. The first side 108 may be referred to herein as a front side 108, and the second side 110 may be referred to as a back side 110. The distance between the front side 108 and the back side 110 defines the thickness 112 of the composite panel 106. The illustrated portion of the panel assembly 100 includes a perimeter edge 114 of the composite panel 106. The perimeter edge 114 extends along the perimeter (e.g., outer boundary) of the panel 106.

The composite panel 106 is a layered build-up or stack-up of multiple different materials. The term "composite panel" as used herein indicates that the panel 106 is composed of multiple different component elements. The composite panel 106 is also referred to as panel 106 herein. The panel 106 includes a first face sheet 116, a second face sheet 118, and a core layer 120 disposed between the first face sheet 116 and the second face sheet 118. The face sheets 116, 118 may be bonded to corresponding opposite sides of the core layer 120 via an adhesive. The face sheets 116, 118 provide structural rigidity to the panel 106 when bonded together with the core layer 120. For example, the assembled build-up of the face sheets 116, 118 and the core layer 120 may be significantly stronger and more rigid than each of the components of the build-up individually.

Each of the first and second face sheets 116, 118 includes one or more layers 122, referred to herein as skin layers 122. The skin layers 122 may be composed of fiberglass, metal, carbon, or the like. In the illustrated embodiment, each of the first and second face sheets 116, 118 has multiple skin layers 122 stacked together and bonded to one another to define the respective integrated face sheet 116, 118. For example, one or both of the face sheets 116, 118 may include multiple plies of fiberglass skin layers 122 bonded together via an adhesive. The adhesive may be an epoxy or the like. In the illustrated embodiment, both face sheets 116, 118 have three respective skin layers 122. More or less than three skin layers 122 may be used in other embodiments. Furthermore, in other embodiments the two face sheets 116, 118 may have different numbers of skin layers 122, different dimensions, and/or different material compositions of skin layers 122, relative to each other.

The core layer 120 has different material compositions along different sections of the panel 106. For example, along a first section 124 of the panel 106, the core layer 120 is defined by a base material 126. Along a second section 128 of the panel 106, the core layer 120 is defined by a honeycomb structure 130. In the illustrated portion of the panel assembly 100, the base material 126 and the honeycomb structure 130 define a seam 134 therebetween which represents an interface between the first section 124 and the second section 128 of the panel 106. In an embodiment, the base material 126 and the honeycomb structure 130 are co-planar and non-overlapping, such that the first section 124 which includes the base material 126 is discrete from the second section 128 which includes the honeycomb structure 130. The base material 126 and the honeycomb structure 130 are referred to as non-overlapping, although it is possible that there may be a negligible amount of material that crosses over the seam 134. In the illustrated embodiment, the first section 124 extends from the seam 134 to the perimeter edge 114. The base material 126 defines the core layer 120 along the portion of the perimeter edge 114 shown. Optionally, as described herein, the base material 126 may define the core layer 120 along the entire perimeter length of the panel 106. The second section 128, which includes the honeycomb structure 130, extends from the seam 134 into the portion of the panel 106 that is not shown in FIG. 3.

The base material 126 has a first (e.g., front) surface 136 that bonds to an interior surface 138 of the front face sheet 116, and a second (e.g., back) surface 140 that bonds to an interior surface 142 of the back face sheet 118. The surfaces 136, 140 may be bonded to the face sheets 116, 118 via an adhesive. Similarly, the honeycomb structure 130 may have a first (e.g., front) surface 144 that bonds to the interior surface 138 of the front face sheet 116, and a second (e.g., back) surface 146 that bonds to the interior surface 142 of the back face sheet 118. The surfaces 144, 146 may be bonded to the face sheets 116, 118 via the adhesive.

The honeycomb structure 130 may include an array or lattice of interconnected cells. The cells may be oriented generally parallel to the thickness 112 dimension of the panel 106, such that the cells extend from the front face sheet 116 to the back face sheet 118. The cells may have repeating shapes. The cell shapes may be hexagonal, pentagonal, quadrilateral, octagonal, or the like. The honeycomb structure 130 may be formed of a non-metallic material (e.g., aramid, fiberglass, etc.) and/or a metallic material (e.g., aluminum, titanium, etc.). In an embodiment, the honeycomb structure 130 is a non-metallic aramid fiber reinforced structure that is coated with a resin, such as phenolic resin. The honeycomb structure 130 is relatively porous and lightweight. For example, a majority of the volume of the honeycomb structure 130 within the core layer 120 may be occupied by air, rather than the structure 130.

The base material 126 is structurally and/or compositionally different from the honeycomb structure 130. For example, the base material 126 may be more dense, more rigid, stronger, and/or less porous than the honeycomb structure 130. As a consequence, the base material 126 may weigh more than the honeycomb structure 130 per a given volume. The base material 126 may be a bulk material, a padding material, an insulative material, or the like, that fills the space between the face sheets 116, 118 along the first section 124. In an embodiment, the base material 130 is a foam material, such as a high density foam. The high density foam may have a density of at least 2 pounds per cubic foot, and optionally has a density of at least 2.5 pounds per cubic foot. The high density foam The high density foam may have a foam indentation force deflection (IFD) value of at least 45 pounds, and optionally has an IFD value of at least 60 pounds. The high density foam is structurally firm to retain the thickness and shape of the panel 106 along the first segment 124, at least when bonded to the face sheets 116, 118. In an embodiment, the base material 126 is or at least includes urethane foam. The base material 126 may have a different compositions in another embodiment, such as a lower (e.g., medium) density foam, a potting compound, a resin (e.g., an epoxy resin), a thermoplastic, a fiber board, a particle board, a rubber or synthetic rubber material, or the like.

The composite panel 106 defines the hole 132 through the first segment 124. The hole 132 continuously extends through the front face sheet 116, the base material 126, and the back face sheet 118. The hole 132 is sized and shaped to receive one of the fasteners 104 therein. In an embodiment, the composite panel 106 defines a plurality of holes 132 like the hole 132 that is shown in FIG. 3. The holes 132 are all located along the first segment 124 of the panel 106, such that the holes 132 are defined through the base material 126. In an embodiment, none of the holes 132 is located along the second segment 128 of the panel 106. The fasteners 104 inserted into the holes 132 do not penetrate through the honeycomb structure 130.

In an embodiment, the panel assembly 100 includes an insert element 148 that is disposed within the hole 132. The insert element 148 is a sleeve, bushing, or other barrel-shaped object that defines a channel 150 through the length of the insert element 148. The insert element 148 may be installed within the hole 132 at a stage of the manufacturing process after forming the hole 132. The insert element 148 may be secured to the panel 106 via an interference fit, chemical bonding (e.g., an adhesive), or the like. The insert element 148 may have flanges 152 or tabs that mechanically interact with the base material 126 and/or the face sheets 116, 118 to retain the insert element 148 in a fixed, secured position within the hole 132. When installed, the channel 150 extends along a channel axis that is parallel to the thickness dimension 112 of the panel 106. The channel 150 is sized and shaped to receive the fastener 104 therethrough. The insert element 148 may be composed of a rigid material, such as metal.

To mount the panel assembly 100, the fastener 104 is inserted through the channel 150 of the insert element 148. The fastener 104 in the insert element 148 passes through the hole 132 in the panel 106. The fastener 104 may be longer than the thickness 112 of the panel 106, such that a distal segment 154 of the fastener 104 projects beyond the panel 106 and couples to the structural support 102. In the illustrated embodiment, the fastener 104 is loaded to penetrate the front face sheet 116 before penetrating the back face sheet 118.

The fastener 104 may be of any type that can support and reliably affix the panel assembly 100. Suitable fasteners 104 may include bolts, screws, rivets, or the like. In an embodiment, the fastener 104 is a quarter-turn fastener 104. For example, the distal segment 154 of the quarter-turn fastener 104 may extend through a hole 156 in the structural support 102 and then into a receptacle connector 158. The segment of the structural support 102 that defines the hole 156 is between the receptacle connector 158 and the panel 106. The distal segment 154 of the fastener 104 mechanically couples to the receptacle connector 158 to secure the panel assembly 100 to the structural support 102. The quarter-turn fastener 104 may couple to the receptacle connector 158 by rotating the fastener 104 to a locked rotational orientation relative to the receptacle connector 158. The quarter-turn fastener 104 may be selectively uncoupled from the structural support 102 by rotating the fastener 104 to an unlocked rotational orientation relative to the receptacle connector 158.

The panel assembly 100 may include a compressible seal (e.g., gasket) 164 that is located in the space between the panel 106 and the structural support 102. As the fastener 104 couples to the structural support 102, the seal 164 may be compressed between the back side 110 of the panel 106 and a front surface 166 of the structural support 102. The seal 164 may absorb vibration. The panel assembly 100 optionally includes one or more washers 168 for providing contact surfaces between the interconnecting components (e.g., the fastener 104, the panel 106, the structural support 102, etc.).

In an embodiment, the panel 106 includes an additional liner 160 on the front face sheet 116. The liner 160 is secured to an exterior surface 162 of the front face sheet 116. The front face sheet 116 is between the liner 160 and the core layer 120, and the liner 160 defines the front side 108 of the panel 106. The liner 160 may enhance the ability of the composite panel 106 to withstand impact forces without scratching or damage to the front face sheet 116. For example, when the panel assembly 100 is installed within a cargo area of a vehicle, the liner 160 may be a cargo liner that faces the cargo and absorbs impacts from the cargo and the machinery used to move the cargo. The liner 160 may be composed of fiberglass, aramid, metal, or the like. In an embodiment, the liner 160 is a woven fiberglass cloth reinforced polyester or a woven fiberglass cloth reinforced phenolic. The panel 106 may be relatively thin. In an embodiment, the thickness 112 is less than two inches, and preferably is less than one inch.

Figure 4:
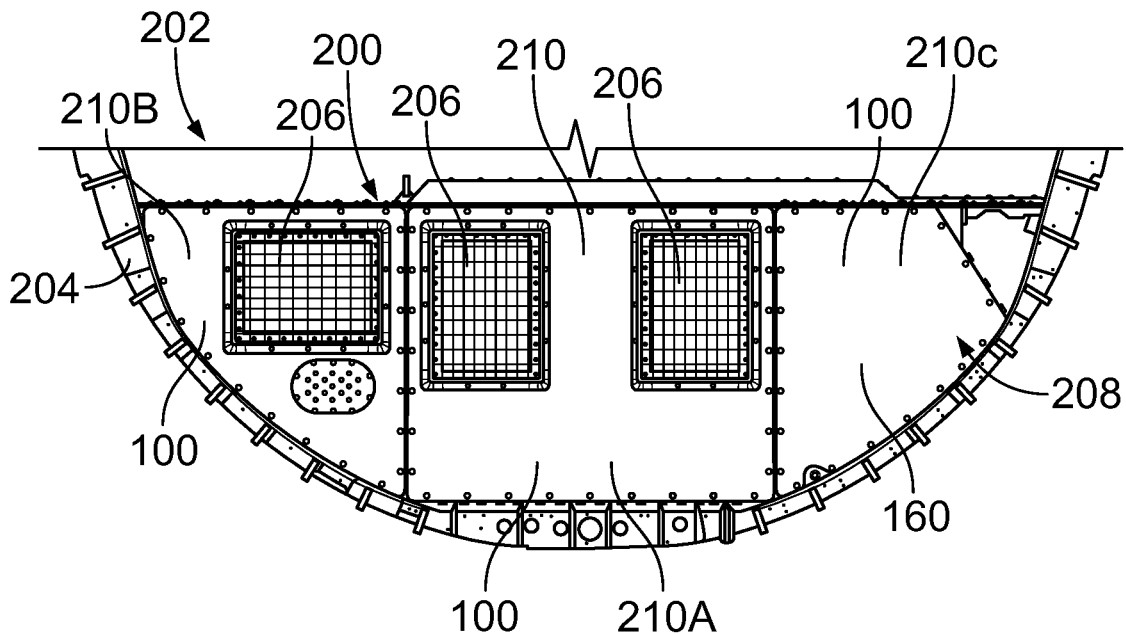
FIG. 4 is a plan view of a bulkhead wall of an aircraft that includes the panel assembly according to an embodiment.

FIG. 4 is a plan view of a bulkhead wall 200 of an aircraft 202 that includes the panel assembly 100 according to an embodiment. The aircraft 202 may be same or similar to the aircraft 30 in FIG. 2. The bulkhead wall 200 is affixed to a fuselage 204 of the aircraft 202. The bulkhead wall 200 partitions an internal volume of the fuselage 204. The bulkhead wall 200 may mechanically support the structure of the fuselage 204. For example, the bulkhead wall 200 is coupled to the fuselage 204 at multiple different locations within a plane that is transverse to a longitudinal axis of the fuselage 204. The bulkhead wall 200 may absorb stresses and strain during flight, takeoff, and landing to maintain the curved shape of the fuselage 204. The bulkhead wall 200 optionally may be a pressure bulkhead that is sealed to the fuselage to provide a sealed pressure vessel within the fuselage 204. For example, vents 206 may be installed within the bulkhead wall 200 that are used to control the air pressure within the fuselage 204. The vents 206 may be decompression vents that provide pressure relief.

The bulkhead wall 200 includes multiple bulkhead panels 210. Three bulkhead panels 210 are shown in FIG. 4, including a center bulkhead panel 210A, a left bulkhead panel 210B, and a right bulkhead panel 210C. The bulkhead panels 210A-C are connected to define the bulkhead wall 200. In an embodiment, each of the three bulkhead panels 210A-C includes the panel assembly 100 shown in FIG. 3. Stated differently, the panel assembly 100 in FIG. 3 may be a bulkhead panel 210. For example, each of the three bulkhead panels 210A-C may have a cross-section that is the same or similar to the cross-section of the panel assembly 100 in FIG. 3. The panel assembly 100 may be useful in the bulkhead wall 200 of the aircraft 202 because the panel assembly 100 is strong and rigid to absorb forces from the fuselage 204, and is also relatively lightweight. Alternatively, one or two, but not all three, of the bulkhead panels 210A-C includes the panel assembly 100. In another alternative embodiment, the entire bulkhead wall 200 is defined by a single, monolithic bulkhead panel (rather than multiple connected panels), and the single panel includes the panel assembly 100.

In an embodiment, the bulkhead wall 200 is disposed within a cargo area 208 (e.g., cargo bay) of the aircraft 202. The cargo area 208 may be below a passenger cabin. The liner 160 of the panel assembly 100 may be a cargo liner. The panel assembly 100 may be oriented such that the liner 160 faces a space that includes cargo, to protect the bulkhead wall 200 from impacts exerted by the cargo or equipment used to move the cargo. In other embodiments, the panel assembly 100 may be utilized in bulkhead walls that are outside of the cargo area 208, such as in a passenger cabin. Furthermore, the panel assembly 100 can be installed in other locations of the aircraft 202 discrete from bulkheads, such as doors, walls, ceilings, and the like.

Figure 5:
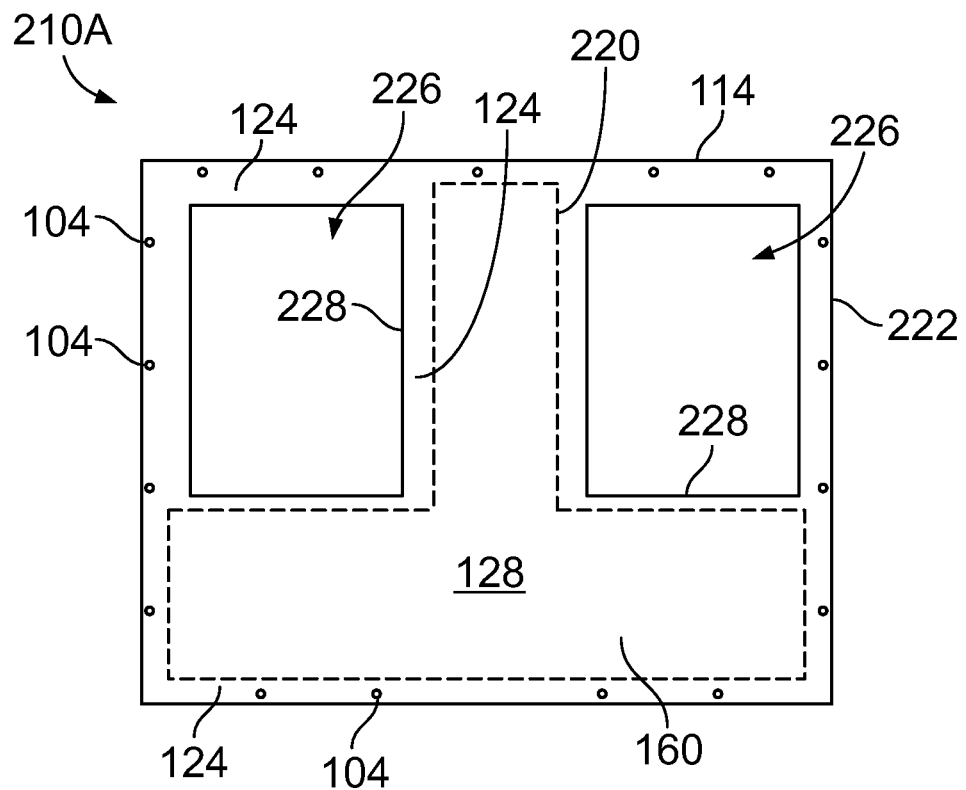
FIG. 5 is a plan view of a center bulkhead panel of the bulkhead wall shown in FIG. 4 according to an embodiment.

FIG. 5 is a plan view of the center bulkhead panel 210A of the bulkhead wall 200 shown in FIG. 4 according to an embodiment. The center bulkhead panel 210A represents the panel assembly 100 shown in FIG. 3. For example, the panel 210A includes the first section 124, in which the core is the base material 126 (FIG. 3), and the second section 126, in which the core is the honeycomb structure 130 (FIG. 3). The broken line 220 indicates the location of the interface between the sections 124, 126.

In an embodiment, the first section 124 that includes the base material follows a contour of the perimeter 222 of the panel 210A. Optionally, the first section 124 is located along all perimeter edges 114, which in aggregate define the perimeter 222. The first section 124 may surround the second section 126, as shown in FIG. 5. For example, the honeycomb structure 130 may be encased above and below by the two face sheets 116, 118 (shown in FIG. 3), and may be surrounded along the sides by the base material 126. It is noted that the base material 124 is not merely a thin strip added to the perimeter edges 114 of the panel 210A. Rather, as shown in FIG. 3, the base material 124 occupies at least an area (e.g., a perimeter border area) along the interior surfaces 138, 142 of the face sheets 116, 118 (shown in FIG. 3). The perimeter border area extends a width from the perimeter edge 114 towards a center of the panel 210A. The width is sufficient to accommodate the holes 132 that receive the fasteners 104. The width of the perimeter border area may be selected based on application-specific considerations. For example, suitable widths of the base material 126 (e.g., the first section 124) in one use-application may be between 0.4 inches and 4 inches. The width of the perimeter border area may vary at different sections of the panel 210A.

The panel 210A may include one or more openings 226 (e.g., vent openings) sized and shaped to receive a corresponding vent 206 (shown in FIG. 4). The panel 210A has two openings 226 in the illustrated embodiment. The openings 226 continuously extend through a full thickness of the panel assembly 210A. The vents 206 mount within the openings 226. In the illustrated embodiment, the first section 124 borders the openings 226 as well as the perimeter 222. For example, the base material 126 may extends along an edge 228 of each opening 226 to surround the openings 226. The honeycomb structure 130 in the second section 128 is spaced apart from the openings 226 (and from the perimeter edges 114) by the base material 126.

FIG. 5 shows multiple fasteners 104 that are coupled to the panel 210A for mounting the panel 210A to a structural support of the aircraft 202. Each of the fasteners 104 may be located within the first section 124 that includes the base material 126. In an embodiment, none of the fasteners 104 used to mount the panel 210A is located in the second section 128, so none of the fasteners 104 penetrates through the honeycomb structure 130. The panel 210A may include additional holes (not shown) for receiving fasteners to secure the vents 206 (FIG. 4) within the vent openings 226. These additional holes for mounting the vents 206 may also be located within the first section 124, and spaced apart from the second section 126.

Figure 6:
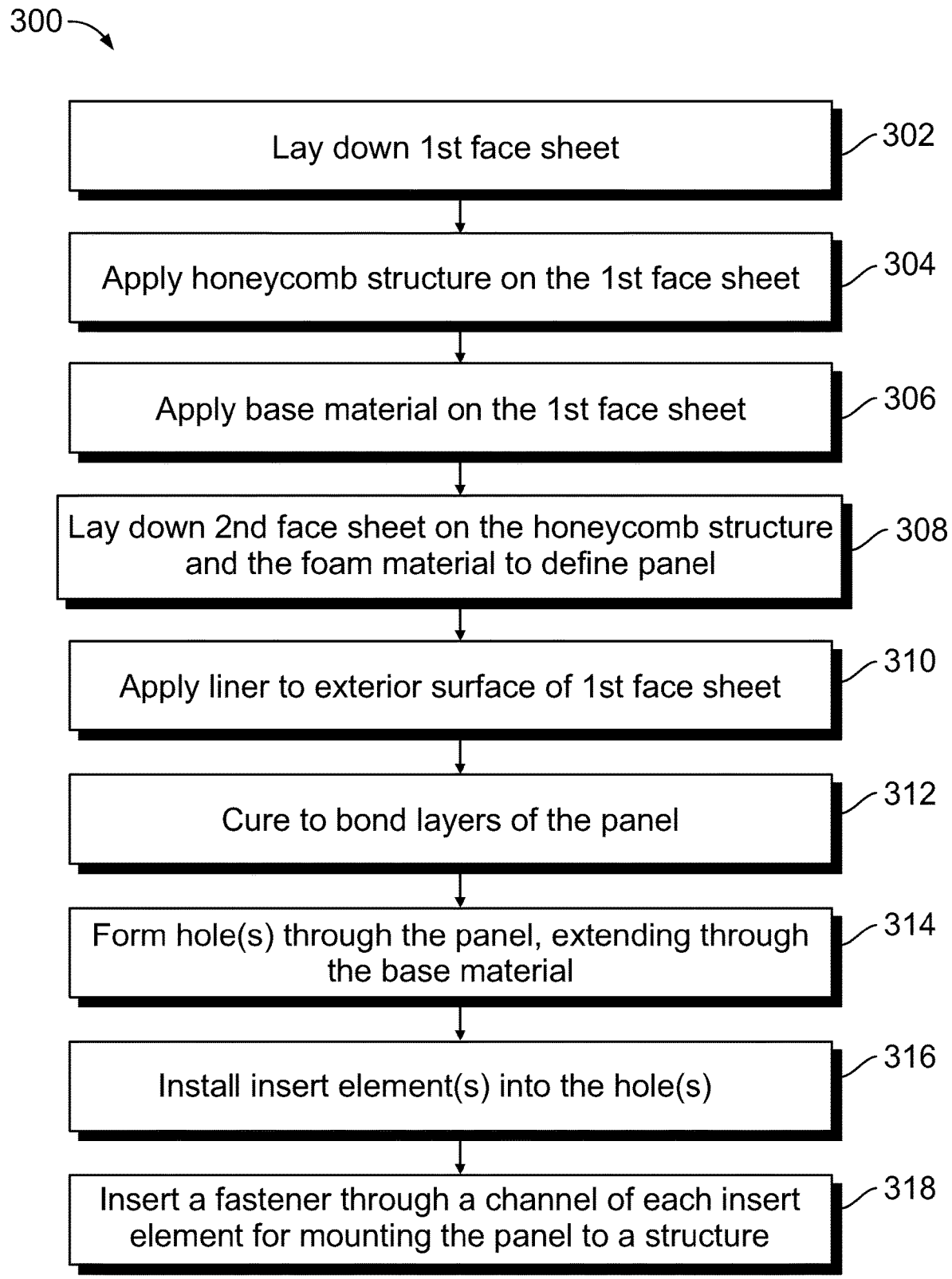
FIG. 6 is a flow chart of a method for assembling a panel, according to an embodiment of the present disclosure.

FIG. 6 is a flow chart 300 of a method for assembling a panel according to an embodiment. The panel may be assembled for installation onboard a vehicle, such as an aircraft. The panel can be installed on non-aircraft vehicles and even in non-vehicular structures, such as in various types of buildings. The method may include more steps, fewer steps, and/or different steps than shown in the flow chart 300. Furthermore, the steps of the method may be performed in a different order than the chronological order presented in FIG. 6 unless specified.

The method includes, at step 302, laying down a first face sheet 116. The first face sheet 116 may be laid on a build platform. At step 304, a honeycomb structure 130 is applied on an interior surface 138 of the first face sheet 116. In an embodiment, the honeycomb structure 130 may be pre-formed into one or more sections and bonded to the interior surface 138 of the face sheet 116 via an adhesive. The honeycomb structure 130 is applied to be spaced apart from edges of the face sheet 116. The adhesive bonds the honeycomb structure 130 to the face sheet 116. In an alternative embodiment, the honeycomb structure 130 may be formed (e.g., in-situ) directly on the interior surface 138 via additive manufacturing or the like.

At step 306, a base material 126 is applied on the interior surface 138 of the first face sheet 116. The honeycomb structure 130 and the base material 126 are secured to different portions of the interior surface 138. The honeycomb structure 130 and the base material 126 may be disposed next to each other and are generally non-overlapping, except for the possibility of a negligible amount of material overlap occurring at a seam 134 between the two materials. At step 306, the base material 126 may be secured along a perimeter border area of the first face sheet 116. The perimeter border area extends to a perimeter edge 114 of the first face sheet 116. The base material 126 may at least partially surround the honeycomb structure 130. In an embodiment, the base material 126 may be pre-formed into one or more sections and bonded to the interior surface 138 of the face sheet 116 via an adhesive. In an alternative embodiment, the base material 126 may be formed (e.g., in-situ) directly on the interior surface 138 via molding, additive manufacturing, or the like.

At step 308, a second face sheet 118 is laid down on the honeycomb structure 130 and the base material 126 such that the honeycomb structure 130 and the base material 126 are sandwiched between the first and second face sheets 116, 118. The resulting panel 106 has a composite, layered structure that is relatively strong, rigid, and lightweight. The second face sheet 118 may be bonded to the honeycomb structure 130 and/or the base material 126 via an adhesive.

In the alternative embodiment in which the base material 126 is formed in place, the step 308 may occur prior to the step 306 such that the second face sheet 118 is bonded to the honeycomb structure 130 before the base material 126 is applied. The base material 126 may then be injected or otherwise applied to fill the open spaces that extend between the face sheets 116, 118 and between the edges and the honeycomb structure 130.

Optionally, the method may include securing one or more additional layers of material to the panel 106. For example, at step 310, a liner 160 is secured to an exterior surface 162 of the first face sheet 116. The liner 160 may be an outer surface layer that protects the panel 106 from scratches and/or dents.

At step 312, the composite panel 106 may be cured to bond the discrete layers and materials of the panel 106 together. The curing may occur by placing the panel 106 in an oven set at a specific temperature for a designated amount of time. The curing step may form an integrated, monolithic panel structure. The cured panel may be stronger and more rigid than the individual components.

Although the description above refers to applying the honeycomb structure 130 to the first face sheet 116 and then subsequently applying the honeycomb structure 130 to the second face sheet 118, it is recognized that the face sheets 116, 118 may be swapped. For example, the honeycomb structure 130 may be secured to the second face sheet 118, and then the first face sheet 116 is secured to the honeycomb structure 130 to define the panel 106.

At step 314, at least one hole 132 is formed that continuously extends through the first face sheet 116, the base material 126, and the second face sheet 118. Each hole 132 is spaced apart from the honeycomb structure 130 along the area of the panel 106. Each hole 132 is disposed proximate to the perimeter 222 of the panel 106. Forming at least one hole 132 may include forming a plurality of holes 132 that are spaced apart from each other along a length of the perimeter 222. At step 316, an insert element 148 is loaded or installed within each corresponding hole 132. Each insert element 148 defines a channel 150 therethrough. The one or more insert elements 148 may be secured to the panel 106 by bonding the insert elements 148 to the panel 106. For example, a potting material may be applied to secure the insert elements 148 within the holes 132.

At step 318, a fastener 114 is inserted through the channel 150 of each insert element 148. In an embodiment in which the panel 106 includes a plurality of insert elements 148 within a plurality of holes 132, step 318 includes inserting a plurality of the fasteners 114 into different corresponding channels 150 of the insert elements 148. The fastener 114 within each channel 150 extends through the hole 132 in the panel 106. A distal portion 154 of the fastener 114 may project beyond the panel 106 for mounting the panel 106 to a structure (e.g., structural support 102). The structural support 102 may be a component of a vehicle, such as an aircraft 30, 202. The distal portion 154 of the fastener 114 may couple to the structural support 102, either directly or via mechanical connection with a receptacle connector 158. The fastener 114 in an embodiment is a quarter-turn fastener. The quarter-turn fastener may enable tool-less mounting of the panel 106.

As described herein, the panel assembly and method of assembly are configured to provide strong, rigid, and lightweight composite panel that is suitable for use on aircraft and other types of vehicles and structurally support the vehicle bodies by absorbing stresses and strain. The panel assembly described herein also avoids the use of a discrete frame that is secured to a panel for mounting the panel. The manufacturing of the panel assembly may be more efficient, economical, and less complex than the manufacturing the known assembly that includes the discrete frame.

Clause 1: A panel assembly for use in a vehicle, the panel assembly comprising:
   a first face sheet;
   a second face sheet; and
   a core layer disposed between the first and second face sheets, wherein the core layer is defined by a base material along a first section of the panel assembly, and the core layer is defined by a honeycomb structure along a second section of the panel assembly, wherein the first section and the second section are discrete, and the first section that includes the base material extends along a perimeter of the panel assembly.

Clause 2. The panel assembly of Clause 1, wherein the first section surrounds the second section.

Clause 3. The panel assembly of Clause 1 or Clause 2, wherein the first section of the panel assembly defines a hole that continuously extends through the first face sheet, the base material, and the second face sheet, the hole sized and shaped to receive a fastener for mounting the panel assembly to a structural support in the vehicle.

Clause 4. The panel assembly of Clause 3, further comprising an insert element disposed within the hole, the insert element defining a channel configured to receive the fastener therethrough.

Clause 5. The panel assembly of Clause 3, further comprising the fastener, wherein the fastener is a quarter-turn fastener.

Clause 6. The panel assembly of any of Clauses 1-5, wherein the first and second face sheets are bonded to the core layer via an adhesive.

Clause 7. The panel assembly of any of Clauses 1-6, wherein the base material is a high density foam material.

Clause 8. The panel assembly of Clause 7, wherein the high density foam material includes urethane foam.

Clause 9. The panel assembly of any of Clauses 1-8, further comprising a liner secured to the first face sheet such that the first face sheet is disposed between the liner and the core layer.

Clause 10. The panel assembly of any of Clauses 1-9, wherein each of the first and second face sheets comprises one or more skin layers, each skin layer of the one or more skin layers comprises a fiberglass material or a metal material.

Clause 11. The panel assembly of any of Clauses 1-10, wherein the panel assembly is a bulkhead panel configured to be mounted within a cargo area of the vehicle.

Clause 12. The panel assembly of any of Clauses 1-11, wherein the first section that includes the base material is located along all edges of the panel assembly.

Clause 13. A method for assembling a composite panel, the method comprising:
securing a honeycomb structure to an interior surface of a first face sheet;
securing a base material to the interior surface of the first face sheet, the base material and the honeycomb structure being secured to different portions of the interior surface, and the base material extending along a perimeter border area of the first face sheet; and
securing a second face sheet to at least one of the honeycomb structure or the base material such that the honeycomb structure and the base material are sandwiched between the first and second face sheets.

Clause 14. The method of Clause 13, further comprising:
forming a hole that continuously extends through the first face sheet, the base material, and the second face sheet, the hole spaced apart from the honeycomb structure; and
inserting a fastener through the hole for mounting the composite panel to a structural support.

Clause 15. The method of Clause 14, further comprising:
installing an insert element within the hole, prior to inserting the fastener through the hole, the insert element defining a channel, wherein inserting the fastener through the hole comprises inserting the fastener through the channel of the insert element.

Clause 16. The method of any of Clauses 13-15, wherein securing the honeycomb structure to the interior surface of the first face sheet and securing the base material to the interior surface comprises bonding the honeycomb structure and the base material to the interior surface via an adhesive.

Clause 17. The method of any of Clauses 13-16, further comprising securing a liner to an exterior surface of the first face sheet such that the first face sheet is disposed between the liner and each of the honeycomb structure and the base material.

Clause 18. An aircraft comprising:
a fuselage defining an internal volume and including one or more structural supports; and
a panel assembly coupled to the fuselage within the internal volume, the panel assembly comprising:
a first face sheet;
a second face sheet;
a core layer disposed between the first and second face sheets, wherein the core layer is defined by a base material along a first section of the panel assembly, and the core layer is defined by a honeycomb structure along a second section of the panel assembly, wherein the first section and the second section are discrete, and the first section that includes the base material follows a contour of a perimeter of the panel assembly, the panel assembly defining multiple holes that continuously extend through the first face sheet, the base material, and the second face sheet, the holes spaced apart from the honeycomb structure; and
multiple fasteners extending through the holes and coupled to the one or more structural supports to mount the panel assembly to the fuselage.

Clause 19. The aircraft of Clause 18, wherein the internal volume comprises a cargo area configured to contain cargo to be transported on the aircraft, and the panel assembly is a component of a bulkhead wall within the cargo area.

Clause 20. The aircraft of Clause 18 or Clause 19, wherein the panel assembly defines an opening that continuously extends through a full thickness of the panel assembly, and the aircraft further comprises a vent mounted within the opening, wherein the base material of the panel assembly extends along an edge of the opening and surrounds the vent.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

As used herein, approximating value modifiers such as "about," "substantially," "generally," and "approximately" inserted before a numerical value indicate that the value can represent other values within a designated threshold range above and/or below the specified value without resulting in a change in the basic function to which it may be related.

Accordingly, a value modified by a term or terms, such as "about," "substantially," "generally," and "approximately," may be not to be limited to the precise value specified. The approximating terms may indicate inclusion of values within a designated threshold margin of the precise value. The threshold margin may be plus/minus 3% of the precise value, plus/minus 5% of the precise value, plus/minus 10% of the precise value, or the like. Two items or axes that are generally parallel can be angled within 3 degrees of each other in one example, within 5 degrees of each other in a second example, and within 10 degrees of each other in a third example.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A panel assembly for use in a vehicle, the panel assembly comprising:
 a first face sheet;
 a second face sheet;
 a core layer disposed between the first and second face sheets, wherein the core layer is defined by a high density foam material along a first section of the panel assembly, and the core layer is defined by a honeycomb structure along a second section of the panel assembly, wherein the first section and the second section are discrete so that the high density foam material and the honeycomb structure are non-overlapping and co-planar, and the first section that includes the high density foam material extends along a perimeter of the panel assembly, wherein the high density foam material has a greater strength and density than the honeycomb structure, wherein the first section defines a hole that continuously extends through the first face sheet, the high density foam material, and the second face sheet, and the second section is void of any holes that continuously extend through the first face sheet, the honeycomb structure, and the second face sheet; and
 an insert element extending through the first face sheet, the high density foam material, and the second face sheet within the hole, the insert element defining a channel configured to receive a fastener therethrough for mounting the panel assembly to a structural support in the vehicle.

2. The panel assembly of claim 1, wherein the first section surrounds the second section.

3. The panel assembly of claim 1, further comprising the fastener disposed within the channel of the insert element and extending through the first face sheet, the high density foam material, and the second face sheet, wherein the fastener is a quarter-turn fastener.

4. The panel assembly of claim 1, wherein the first and second face sheets are bonded to the core layer via an adhesive.

5. The panel assembly of claim 1, wherein the high density foam material includes urethane foam.

6. The panel assembly of claim 1, further comprising a liner secured to the first face sheet such that the first face sheet is disposed between the liner and the core layer.

7. The panel assembly of claim 1, wherein each of the first and second face sheets comprises one or more skin layers, each skin layer of the one or more skin layers comprises a fiberglass material or a metal material.

8. The panel assembly of claim 1, wherein the panel assembly is a bulkhead panel configured to be mounted within a cargo area of the vehicle.

9. The panel assembly of claim 1, wherein the first section that includes the high density foam material is located along all edges of the panel assembly.

10. The panel assembly of claim 1, wherein the insert element has flanges that mechanically contact at least one of (i) the high density foam material or (ii) the first and second face sheets to retain the insert element within the hole.

11. The panel assembly of claim 1, wherein the insert element is composed of a metal material.

12. The panel assembly of claim 1, wherein the core layer along the first section has approximately a same thickness as the core layer along the second section.

13. A method for assembling a composite panel, the method comprising:
 securing a honeycomb structure to an interior surface of a first face sheet;
 securing a foam material to the interior surface of the first face sheet, the foam material and the honeycomb structure being secured to different portions of the interior surface, and the foam material extending along a perimeter border area of the first face sheet, wherein the foam material and the honeycomb structure are non-overlapping and co-planar, wherein the foam material has a greater strength and density than the honeycomb structure;
 securing a second face sheet to at least one of the honeycomb structure or the foam material such that the honeycomb structure and the foam material are sandwiched between the first and second face sheets;

forming a hole that continuously extends through the first face sheet, the foam material, and the second face sheet, the hole spaced apart from the honeycomb structure, wherein forming the hole comprises not forming any holes that continuously extend through the first face sheet, the honeycomb structure, and the second face sheet; and installing an insert element within the hole to extend through the first face sheet, the foam material, and the second face sheet, the insert element defining a channel configured to receive a fastener therethrough for mounting the composite panel to a structural support.

14. The method of claim 13, further comprising:
inserting the fastener through the channel of the insert element for mounting the composite panel to the structural support.

15. The method of claim 13, wherein securing the honeycomb structure to the interior surface of the first face sheet and securing the foam material to the interior surface comprises bonding the honeycomb structure and the foam material to the interior surface via an adhesive.

16. The method of claim 13, further comprising securing a liner to an exterior surface of the first face sheet such that the first face sheet is disposed between the liner and each of the honeycomb structure and the foam material.

17. An aircraft comprising:
a fuselage defining an internal volume and including one or more structural supports; and
a panel assembly coupled to the fuselage within the internal volume, the panel assembly comprising:
    a first face sheet;
    a second face sheet;
    a core layer disposed between the first and second face sheets, wherein the core layer is defined by a foam material along a first section of the panel assembly, and the core layer is defined by a honeycomb structure along a second section of the panel assembly, wherein the first section and the second section are discrete so that the foam material and the honeycomb structure are non-overlapping and co-planar, and the first section that includes the foam material follows a contour of a perimeter of the panel assembly, wherein the foam material has a greater strength and density than the honeycomb structure, wherein the panel assembly defines multiple holes along the first section that continuously extend through the first face sheet, the foam material, and the second face sheet, wherein none of the holes is located along the second section so that the holes are spaced apart from the honeycomb structure;
    multiple insert elements extending through the first face sheet, the foam material, and the second face sheet within the holes, the insert elements defining respective channels therethrough; and
    multiple fasteners extending through the channels of the insert elements and coupled to the one or more structural supports to mount the panel assembly to the fuselage.

18. The aircraft of claim 17, wherein the internal volume comprises a cargo area configured to contain cargo to be transported on the aircraft, and the panel assembly is a component of a bulkhead wall within the cargo area.

19. The aircraft of claim 17, wherein the panel assembly defines an opening that continuously extends through a full thickness of the panel assembly, and the aircraft further comprises a vent mounted within the opening, wherein the foam material of the panel assembly extends along an edge of the opening and surrounds the vent.

20. The aircraft of claim 17, wherein the insert elements have flanges that mechanically contact at least one of (i) the foam material or (ii) the first and second face sheets to retain the insert elements within the holes.

* * * * *